United States Patent [19]

Kayser

[11] 3,757,550

[45] Sept. 11, 1973

[54] THEFT PREVENTION DEVICE FOR TRAILERS

[76] Inventor: Allan J. Kayser, 345 S. Race St., Denver, Colo. 80209

[22] Filed: Nov. 8, 1971

[21] Appl. No.: 196,561

[52] U.S. Cl. .................................................. 70/232
[51] Int. Cl. ............................................. F16b 41/00
[58] Field of Search .................. 70/14, 57, 58, 229, 70/231, 232; 292/46, 47, 48, 49, 52

[56] References Cited
UNITED STATES PATENTS

| | | | |
|---|---|---|---|
| 3,386,274 | 6/1968 | McIntyre | 70/232 |
| 2,124,035 | 7/1938 | Hurd | 70/232 X |
| 2,630,699 | 3/1953 | Lengdon | 70/232 |
| 2,706,392 | 4/1955 | Lucas | 70/232 |

*Primary Examiner*—Robert L. Wolfe
*Attorney*—Reilly and Lewis

[57] ABSTRACT

A theft prevention device adapted to be locked onto the coupling pin of a trailer to prevent theft of the trailer includes a housing adapted to fit over the coupling pin and a control mechanism within the housing which is activated to positively secure and lock the device on the coupling pin by locking members pivotal into a recessed portion on the coupling pin.

8 Claims, 4 Drawing Figures

Patented Sept. 11, 1973    3,757,550

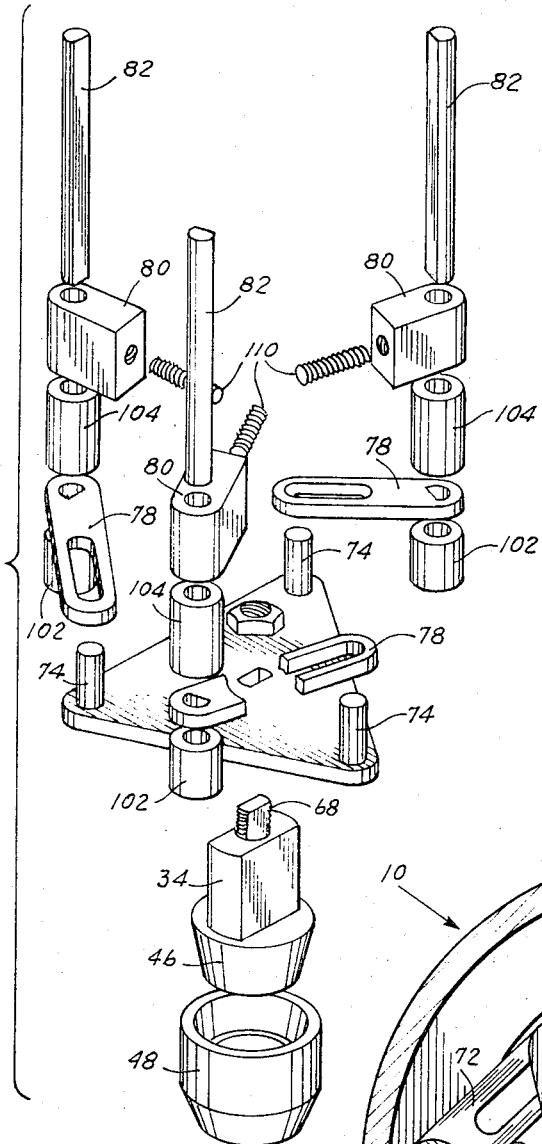
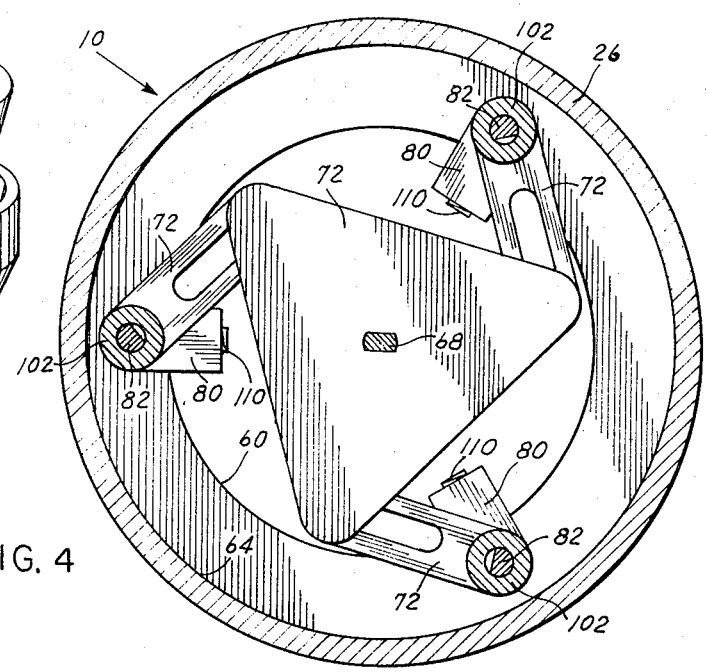
FIG. 3
FIG. 4

THEFT PREVENTION DEVICE FOR TRAILERS

The present invention relates generally to theft prevention devices and more particularly to a new and improved device having a unique locking arrangement so that the device can be locked on the king pin of a trailer whereby to alter the effective external shape and dimensions of the coupling pin so that the trailer cannot be attached to a tractor having a standard coupling plate or otherwise readily attached to a towing vehicle.

Tractor drawn trailers generally have a coupling pin, commonly called a king pin, fixed on the underside of a plate at the front of the trailer which is adapted to be received in a slotted portion of a coupling plate or fifth wheel on a tractor. The coupling pin is annularly recessed whereby, when it is slid into the slotted portion of a coupling plate, an annular shoulder on the coupling pin will prevent the pin from coming out of the slot so that the tractor and trailer can be positively attached or coupled. It is important that the external dimensions and configuration of the coupling pin conform with the accepted standards for coupling pins or it will not fit into or in the alternative will not remain secured in the slotted portion of a tractor coupling plate. The dimensions and configuration of the coupling pin on the tractor have, therefore, become somewhat standardized so that the trailer can be drawn by a variety of tractors. Under such conditions it can be readily understood that an unguarded trailer could easily be stolen by thieves if suitable theft prevention means are not provided on the trailer to convert the conventional design of the coupling pin to one that is not readily attachable to standard tractor coupling plates.

The theft prevention device of the present invention comprises a shroud-type housing which fits over a conventional coupling pin on a trailer and includes a unique control mechanism for positively locking the device to the coupling pin whereby the pin is not exposed and, therefore, cannot be conventionally attached to a tractor coupling plate. The control mechanism includes a pivotal control plate which has peripherally spaced pins that are slidably received in cam slots of control arms keyed to associated pivot shafts in the housing. Each pivot shaft also carries a lock bar which is adapted to pivot into overlying relationship with a shoulder on a standard coupling pin when the control plate is pivoted by a key-actuated lock thereby securing and locking the entire theft prevention device to the coupling pin. With the entire device locked to the coupling pin, the pin is sufficiently encompassed and covered so that it is not exposed for attachment to the coupling member of a tractor thus preventing unauthorized coupling of the trailer and a tractor.

Accordingly, it is an object of the present invention to provide a novel and improved trailer theft prevention device which is adapted to be positively locked on the coupling pin of the trailer to fully enclose the coupling pin whereby it cannot be attached to the coupling plate of a tractor.

It is another object of the present invention to provide a theft prevention device which is placed over the coupling pin of a trailer wherein the device has new and improved means for positively but releasably securing and locking the device on the coupling pin.

It is another object of the present invention to provide a theft prevention device adapted for locking onto the coupling pin of a trailer wherein a key-actuated lock is utilized to operate a control mechanism including a plurality of circumferentially spaced lock bars that can be pivoted into overlying locking relationship with a shoulder on the coupling pin in a positive and dependable manner.

It is still another object of the present invention to provide an inexpensive theft prevention device for trailers which is quickly and easily attachable to the coupling pin of the trailer.

Other objects, advantages and capabilities of the present invention will become more readily appreciated and understood from a description of the present invention when taken in conjunction with the accompanying drawings, in which:

FIG. 3 is an exploded diagrammatic view of the control mechanism and lock assembly.

FIG. 4 is a section taken along line 4—4 of FIG. 2.

Figure 1:
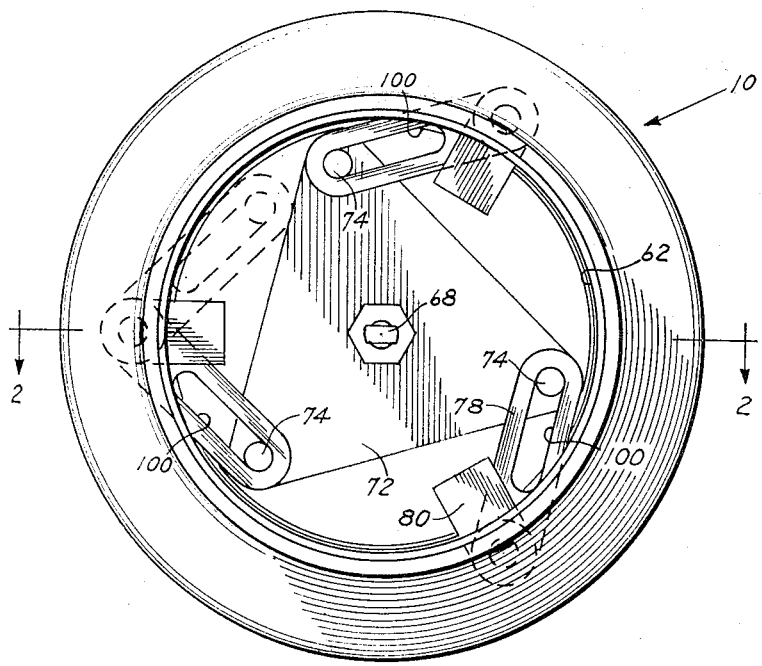
FIG. 1 is a top plan view of the theft prevention device of the present invention.

Referring now to the drawings, the theft prevention device 10 of the present invention can be seen to include a housing 12 which encloses a control mechanism 14 and a tamper-proof actuator or lock assembly 16 for operating the control mechanism. The housing, as will be described in more detail later, is made of a hard and durable material such as steel and adapted to receive a standard coupling or king pin 18 (shown in dotted lines in FIG. 1) of a trailer which, as mentioned hereinbefore, has become standardized in size and shape. The standard king pin 18 is cylindrical in shape, being attached to the underside of a trailer 19 at one end and having an annular intermediate recessed portion 20 defining a shoulder 22 and a head portion at its other end.

Figure 2:
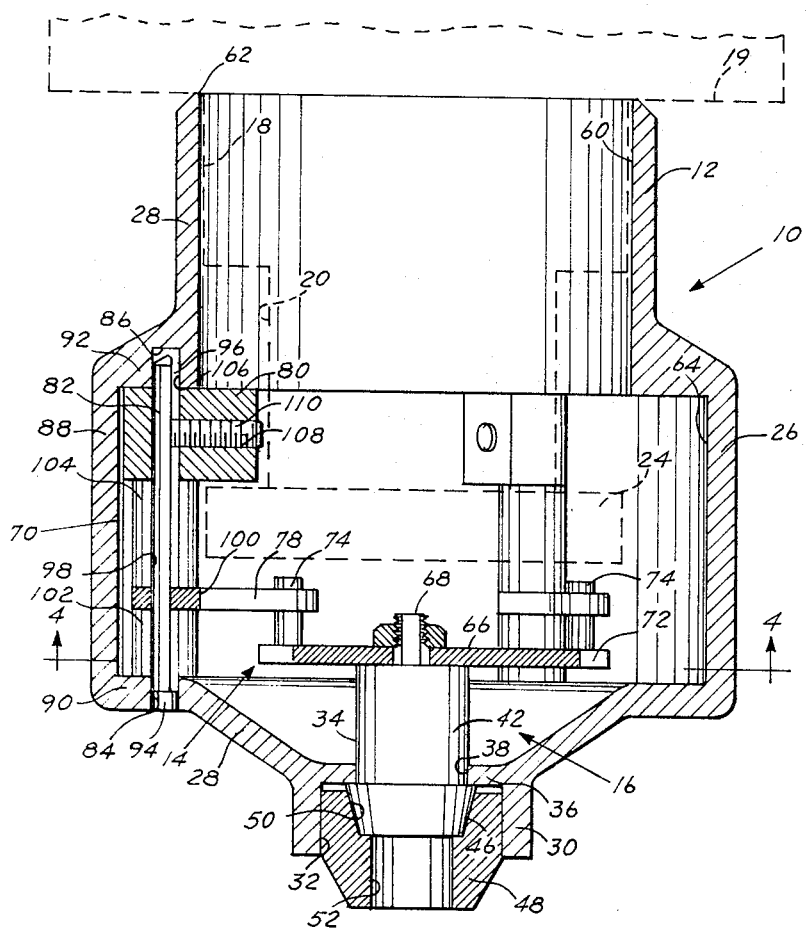
FIG. 2 is a vertical section taken along lines 2—2 of FIG. 1 with a king pin shown in dotted lines received in the device.

With particular reference now to the housing 12, it can be seen in FIG. 1 to be of circular cross section and, as seen in FIG. 2, has a main body portion 26, a neck portion 28 of reduced diameter above the main body portion 26, and a lock receiving portion 28 at the bottom of the main body portion which tapers inwardly and downwardly toward a circular flange 30 defining a cup-shaped cavity 32 in the bottom of the housing. The lock-receiving portion 28 is adapted to receive a conventional tumbler-type lock 34 which will be described in more detail later. The bottom wall 36 of the lock-receiving portion 28 of the housing which is circumscribed by the circular flange 30 has an opening 38 therein which is substantially circular in shape and has flattened diametrically opposed side portions 40. The opening 38 in the bottom wall 36 conforms with the external shape and size of the body 42 of the tumbler lock 34 which is also substantially circular in size and has flattened diametrically opposed sides 44 (only one being seen). The lock 34 has a head portion 46 with a maximum diameter slightly greater than the diameter of the body portion 42 of the lock. In this manner, when the body of the lock is inserted into the opening 38 through the cupped cavity 32 at the bottom of the housing, the body 42 will slide through the opening and the head 46 will abut against the bottom surface of the bottom wall 36 to prevent any further movement of the lock in the upward direction. The lock is held in place by a plug 48 which may be made of steel and press-fitted into the cup-shaped cavity 32 at the bottom of the housing. The plug 49 has a cupped recessed portion 50 adapted to fit tightly over the head 46 of the lock and an axial bore 52 communicating with the cupped portion 50 so that a key for operating the lock can be inserted through the bore 52 and into the head 46 of the lock.

It can be seen in FIG. 2 that the neck portion 28 of the housing defines an internal cavity 60 which has a diameter slightly larger than the diameter of the king pin 18 and opens upwardly through a circular opening 62 in the top of the housing. The cylindrical side wall 60 of the cavity in the neck portion of the housing serves to receive and guide the king pin so that the head 24 of the king pin is moved down into an enlarged cavity 64 within the main body portion 26 of the housing.

The control mechanism 14 for the theft prevention device is disposed within the enlarged cavity 64 and can be seen to include a control plate 66 which is secured to the operating shaft 68 of the tumbler lock and three circumferentially spaced control assemblies, generally designated 70, which are fixed within the housing and operatively connected to the control plate 66. The control plate, as can be seen in FIG. 1 is triangular in shape and includes a base portion 72 and three upwardly extending actuating pins 74 which are embedded in the base 72 adjacent each corner thereof. The center of the base 72 of the control plate has a substantially circular opening 76 which has flat diametrically opposed sides and is adapted to receive the operating shaft 68 of the lock which has a cross-sectional size and shape identical to that of the opening 76 so that, when the operating shaft is inserted through the opening in the control plate until the control plate abuts against the flat end of the body 42 of the lock, the control plate will be caused to have unitary rotational movement with the operating shaft of the lock. The control plate is secured to the operating shaft 68 by a nut 76 threadedly received on the upper end of the operating shaft.

The control assemblies 70 are identical, each including a control arm 78 and a lock bar 80 keyed to or affixedly secured to a pivot pin 82. The pivot pin 82 is received in axially aligned bores 84 and 86 in an annularly protruding segment 88 of the main body portion of the housing such that when the pivot pin is inserted into the two axially aligned bores 84 and 86 it will be out of the way of a king pin which is inserted through the neck portion of the housing and into the main body portion. The lowermost axial bore 84 can be seen to protrude through a bottom wall 90 of the main body portion of the housing whereas the upper bore 86 constitutes a blind hole in an upper wall 92 of the main body of the housing so that the pivot pin can be inserted from the bottom of the housing through the bottom bore 84 until it protrudes into the upper bore 86. The pivot pin is held in place by a hardened steel plug 94 which is press-fitted into the bottom bore 86 beneath the pivot pin. The diameter of the pivot pin is slightly less than the diameter of the two axially aligned bores 84 and 86 so that the pin is free to pivot when in place. The pivot pin is substantially circular in cross section and has one flattened longitudinally extending side 96 for a purpose to be described hereinafter.

The control arm 78 is a flat elongated bar having an opening 98 in one end having a shape identical to the cross-sectional shape of the pivot pin so that when the pivot pin is inserted into the opening 98 the control arm will be keyed to the pivot pin for unitary pivotal movement therewith. At the opposite end of the control arm 78 there is provided an elongated cam slot 100 in which one of the actuating pins 74 on the control plate may protrude.

The control arm 78 is mounted on the pivot pin 82 above a lower spacer collar 102 which has an axial throughbore for receiving the pivot pin. The lower spacer collar 102 rests on the upper surface of the bottom wall 90 of the main body of the housing thereby supporting the control arm 78 at a predetermined level within the housing. A second spacer collar 104 having an axial throughbore is placed on the pivot pin above the control arm 78 and supports one of the lock bars 80. The lock bar fits closely underneath the lower surface of the upper wall 94 of the main body portion of the housing. The lock bar 80 is a relatively thick but short flattened bar of a strong material such as steel having a bore 106 through its thickness which is identical in diameter to the diameter of the pivot pin. A normally extending threaded opening 108 extends from the inner end of the lock bar into communication with the bore 106. A set screw 110 is threadedly received in the threaded opening 108 in such a manner that it can be tightened against the flattened side 96 of the pivot pin to thereby fix the lock bar to the pivot pin for unitary movement therewith. It will, therefore, be appreciated that, between the upper wall 92 and the bottom wall 90 of the main body of the housing, the pivot pin 82 carries a first spacer collar 102, the control arm 78, a second spacer collar 104, and a lock bar 80. The positioning of the lock bar within the housing is such that, when the housing is placed on a king pin 18 so that the circular opening 62 at the top of the neck of the housing abuts against the bottom surface of the trailer 19, the lower edge of the lock bar 80 will be slightly above the shoulder 22 of the king pin.

As mentioned before, each of the actuating pins 74 of the control plate 66 is received in a cam slot 100 in the control arm 78 of each control assembly 70. It can be seen by referring to FIG. 1 that pivotal movement of the control plate 66 about the longitudinal axes of the operating shaft 68 of the lock will cause the actuating pins 74 to cam the control arms 78 so that they are pivoted through a predetermined angular distance. Inasmuch as the control arms are keyed to the associated pivot pins, the pivot pins will also pivot through a corresponding angular distance thereby causing the lock bars 80, which are fixedly secured to the pivot pins, to pivot through the same angular distance and in a plane spaced from the control plate 72. It will thus be appreciated that, by properly assembling the components of the control mechanism 70 and coordinating their positioning with the operating shaft 68 of the lock, the lock bars 80 can be caused to pivot between the phantom line release position as shown in FIG. 1 and a solid line locking position in which they overlie the shoulder 22 of the king pin. When all three of the lock bars are in this solid line overlying position, it will be appreciated that the theft prevention device 10 will be positively secured to the king pin 18 and will be locked in this position by the lock and the control mechanism. Therefore, the only way in which the device can be secured to or removed from the king pin is to operate the lock 16 with a key which is uniquely adapted to fit the lock.

As mentioned hereinbefore, in order that a trailer having a king pin on its underside be attached to the coupling plate of a tractor it is critical that the size and dimensions of the king pin be such that they will ride in the slot provided therefor in the coupling plate of the tractor. With the theft prevention device 10 of the present invention positively secured to and locked on the king pin, it can be seen, particularly in FIG. 2, that the effective external size and dimensions of the king pin are substantially changed. In other words, the effective size and dimensions of the king pin take the size and dimensions of the external surface of the housing 12 which is much larger and different in shape than the king pin. As such, it would be impossible to conventionally attach a king pin having the theft prevention device of the present invention locked thereon to a standard tractor coupling plate. Thus, a theft prevention device made of strong, durable, and tamper-proof material has been described which will prevent unauthorized coupling of a trailer and tractor whereby a trailer having the device locked thereon can be left unattended without fear of theft.

Although the present invention has been described with a certain degree of particularity, it is understood that the present disclosure has been made by way of example and that changes in details of structure may be made without departing from the spirit thereof.

What is claimed is:

1. In a theft prevention device for the coupling pin of a trailer wherein said coupling pin has an annularly recessed portion defining a shoulder, the improvement comprising: an outer housing, locking means within said housing, said locking means including an actuator, a plurality of circumferentially spaced locking members disposed within the housing for movement in a plane spaced from the actuator into and out of locking engagement with the coupling pin, and control means operatively interconnecting the actuator and each one of the locking members whereby the actuator will effect movement of said locking members between a locking position with said coupling pin and an unlocked position away from the coupling pin.

2. In a theft prevention device of the type having a housing adapted to be fitted onto the coupling pin of a trailer, said coupling pin having an annularly recessed portion defining a shoulder, the improvement comprising a lock assembly, a pivotal control plate operatively attached to said lock assembly whereby actuation of said lock will cause said control plate to pivot, and a plurality of circumferentially spaced control assemblies having pivotal lock members, said control assemblies further including control members operatively connected to said control plate whereby pivotal movement of said control plate will effect pivotal movement of said lock members in a plane spaced from said control plate between a locking position wherein they overlie said shoulder on the coupling pin and a release position wherein they do not overlie the shoulder so that the housing can be freely fitted onto or removed from the trailer coupling pin.

3. In the theft prevention device of claim 2, said control assemblies having a pivot pin mounted within the housing for pivotal movement, and wherein said lock members and said control members are secured to said pivot pin for unitary pivotal movement therewith.

4. In the theft prevention device of claim 3, said lock members comprising flattened bars having an opening therein for receiving said pivot pin.

5. In the theft prevention device of claim 4, said control plate being pivotal about a vertical axis and having a plurality of actuating pins adapted to cooperate with said control members such that pivotal movement of the control plate effects predetermined pivotal movement of the control members and consequently the lock members.

6. In the theft prevention device of claim 5, said control members comprising bars having an elongated slot therein defining a camming surface along which one of said actuating pins can move to effect pivotal movement of the control members.

7. In the theft prevention device of claim 6, said control members further including an opening for receiving said pivot pin in a manner such that said pivot pin will be caused to pivot in unison with said control members.

8. A theft prevention device for attachment to a trailer coupling pin having a generally cylindrical body with an annular shoulder, said device comprising in combination a housing, the housing comprising a shroud for the coupling pin with one open end, a neck portion of the housing at said open end adapted to receive and guide the coupling pin in the interior of the housing, an enlarged body portion of the housing, a control mechanism mounted within the body portion of the housing so as to be concealed by the housing, said control mechanism including a control plate mounted for pivotal movement about a vertical axis and having a plurality of circumferentially spaced, upstanding actuating pins, a plurality of circumferentially spaced control assemblies, said control assemblies having pivot pins pivotally mounted in said housing in radially spaced relation from said control plate, a control arm fixedly mounted on each pivot pin so as to pivot in unison therewith, said control arm having an elongated cam slot therein for receiving one of said pivot pins of said control plate in a manner such that pivotal movement of said control plate will effect predetermined pivotal movement of said control arms and consequently said pivot pins, a lock bar fixedly mounted on each of said pivot pins in upwardly spaced relation to said control arms so as to pivot in unison with said control arms and being at a preselected elevation within said housing such that when a trailer coupling pin is disposed within the chamber means the lock bars can be pivoted into overlying relationship with said shoulder on the coupling pin, and a key operable tumbler lock assembly fixedly mounted in said housing so as to be operable from the outside of the housing, said lock assembly having an operating shaft fixedly attached to the control plate so that the control plate will pivot with the operating shaft, said operating shaft being pivotal upon actuation of the lock by a key such that actuation of the lock will effect pivotal movement of the lock bars between a locking position overlying the shoulder on the coupling pin and a release position outwardly of the shoulder wherein the coupling pin may be freely inserted into the housing or removed therefrom.

* * * * *